(12) United States Patent
Kim et al.

(10) Patent No.: US 8,656,901 B2
(45) Date of Patent: Feb. 25, 2014

(54) CUTTING TIP OF FRAME SAW AND FRAME SAW WITH THE CUTTING TIP

(75) Inventors: Soo-Kwang Kim, Irvine, CA (US);
Hee-Dong Park, Gyunggi-do (KR);
Nam-Kwang Kim, Choongcheongbook-do (KR)

(73) Assignees: Ehwa Diamond Industrial Co., Ltd., Kyungki-Do (KR); General Tool, Inc., Irvine, CA (US)

( * ) Notice: Subject to any disclaimer, the term of this patent is extended or adjusted under 35 U.S.C. 154(b) by 1018 days.

(21) Appl. No.: 12/281,004

(22) PCT Filed: Feb. 28, 2007

(86) PCT No.: PCT/KR2007/001031
§ 371 (c)(1),
(2), (4) Date: Dec. 24, 2008

(87) PCT Pub. No.: WO2007/100214
PCT Pub. Date: Sep. 7, 2007

(65) Prior Publication Data
US 2009/0229592 A1    Sep. 17, 2009

(30) Foreign Application Priority Data

Feb. 28, 2006 (KR) ................ 10-2006-0019428

(51) Int. Cl.
*B28D 1/12* (2006.01)
(52) U.S. Cl.
USPC ............................ 125/15; 125/18
(58) Field of Classification Search
USPC .............................. 125/15, 18, 22
See application file for complete search history.

(56) References Cited

U.S. PATENT DOCUMENTS

| 3,176,675 A | * | 4/1965 | Bomba ........................ 125/18 |
| 4,883,500 A | * | 11/1989 | Deakins et al. ................ 51/298 |
| 4,920,946 A | * | 5/1990 | Kuromatsu ..................... 125/18 |

(Continued)

FOREIGN PATENT DOCUMENTS

| BE | 666768 A | 11/1965 |
| EP | 1297928 A1 | 4/2003 |

(Continued)

OTHER PUBLICATIONS

Chinese Office Action for corresponding Chinese patent application No. 200780007032.2 dated Jan. 26, 2011.

(Continued)

*Primary Examiner* — Maurina Rachuba
(74) *Attorney, Agent, or Firm* — Renner, Otto, Boisselle & Sklar, LLP

(57) ABSTRACT

A cutting tip for a cutting tool used to cut or drill a brittle workpiece such as stone, brick, concrete, or asphalt and a frame saw provided with the cutting tip are disclosed. The swing type cutting tip including abrasive particles has a specific arrangement capable of enhancing the cutting efficiency of the abrasive particles, and thus achieving an enhancement in cutting performance and an increase in lifespan. The cutting tip includes a plurality of abrasive particles to cut a workpiece while swing. At least a part of the abrasive particles are arranged in the form of abrasive particle groups. Each abrasive particle group is constituted by at least two abrasive particles. At least a part of the abrasive particles of the abrasive particle groups are overlapped in a cutting direction.

15 Claims, 16 Drawing Sheets

(56) References Cited

U.S. PATENT DOCUMENTS

| | | | |
|---|---|---|---|
| 4,930,486 A * | 6/1990 | Kuromatsu | 125/18 |
| 6,935,940 B2 * | 8/2005 | Skeem et al. | 125/15 |
| 7,134,430 B2 * | 11/2006 | Kim et al. | 125/15 |
| 2003/0084894 A1 * | 5/2003 | Sung | 125/12 |
| 2004/0112359 A1 | 6/2004 | Sung | |
| 2005/0241629 A1 * | 11/2005 | Dossena et al. | 125/12 |
| 2006/0254154 A1 * | 11/2006 | Huang et al. | 51/293 |

FOREIGN PATENT DOCUMENTS

| | | |
|---|---|---|
| FR | 1493699 A | 9/1967 |
| JP | 9-019868 | 1/1997 |
| JP | 2005-177912 | 7/2005 |
| WO | 98/45091 | 10/1998 |
| WO | 2004/014243 A1 | 2/2004 |
| WO | 2005/102576 A1 | 11/2005 |

OTHER PUBLICATIONS

European Search Report for corresponding European Patent Application No. 07715440.9 dated Jun. 21, 2012.

* cited by examiner

Fig. 6
(A)
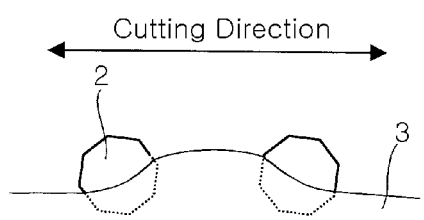
(B)
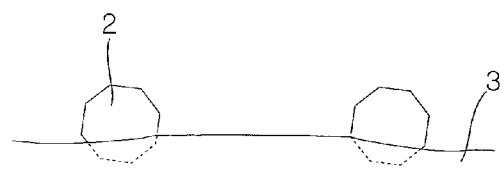
(C)
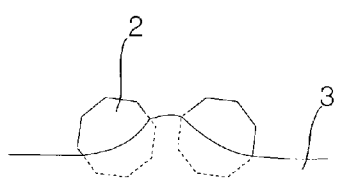

Fig. 7
(A)
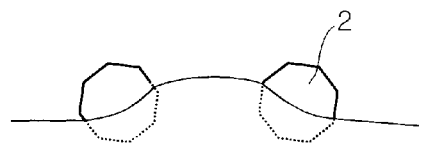
(B)
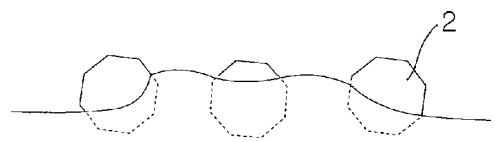
(C)
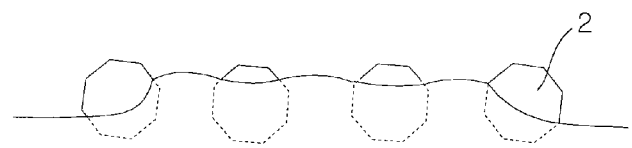

CUTTING TIP OF FRAME SAW AND FRAME SAW WITH THE CUTTING TIP

This application is a national phase of International Application No. PCT/KR2007/001031 filed Feb. 28, 2007 and published in the English language.

TECHNICAL FIELD

The present invention relates to a cutting tip for a cutting tool used to cut or drill a brittle workpiece such as stone, brick, concrete, or asphalt and a cutting tool provided with the cutting tip. More particularly, the present invention relates to a swing type cutting tip for cutting a workpiece while swinging and a frame saw attached with the cutting tip (Hereinafter, the frame saw will also be referred to as a "gang saw".).

BACKGROUND ART

In order to cut or drill a brittle workpiece such as stone, brick, concrete, or asphalt, an abrasive material having a higher hardness than the workpiece is needed.

For such an abrasive, artificial diamond particles, natural diamond particles, cubic boron nitride, and tungsten carbide particles are well known. Of these materials, artificial diamond particles are most widely used.

Artificial diamond (hereinafter, also referred to as "diamond") was invented in the 1950's, and is known as a material having a higher hardness than any other materials on Earth. Due to this property, the diamond is used for a cutting tool, a grinding tool, and the like.

In particular, the diamond is widely used in the stone machining field in association with cutting or grinding a variety of stones such as granite and marble, and in the construction field in association with cutting or grinding concrete structures.

Typically, a cutting tool includes a cutting tip for directly performing a cutting operation, and a body, namely core, for supporting the cutting tip.

Typically, the body has a disc shape. A body having a shape different from the disc shape may be used. For example, a body having a rectilinear shape is used in a gang saw. The gang saw is also called a "frame saw".

In the gang saw, steel shots and diamond particles are used as abrasive materials. The gang saw is used to cut a large-size granite or marble material into a plate shape.

In the case of a cutting tool having a disc-shaped body, the cutting tool cuts a workpiece while rotating about a rotation axis of the body in one direction.

When a workpiece is cut using the above-mentioned disc-shaped cutting tool, tails are formed behind abrasive particles on the cutting surface. The tails are matrix portions remaining without being worn behind abrasive particles.

The tails support the abrasive particles during the cutting process. Accordingly, it is possible to prevent the abrasive particles from being early separated from the matrix of the cutting tip even when the protruded height of the abrasive particles becomes high.

However, the disc-shaped cutting tool has a limitation in cutting large-size stone materials because it cannot cut a workpiece having a size larger than the radius of the disc, even at a maximum cutting depth.

Furthermore, when a larger disc size is used, loss of the raw material increases greatly because the body and tip should become thicker.

On the other hand, an example of a cutting tool (gang saw) having a horizontal body is illustrated in FIGS. 1 to 3.

As shown in FIGS. 1 to 3, the gang saw 10 includes a frame 11, which swings, a plurality of cutting tips 12 attached to the frame 11 to cut a workpiece 1, and a frame driver 13 for swing the frame 11.

The frame 11 swings about pivots 14, generally two pivot points 14.

As the frame 11 swings, abrasive particles 2 on the cutting surface of each cutting tip 12 perform a cutting operation.

In addition to the abrasive particles 2, which directly cut, each cutting tip 12 includes a matrix for binding the abrasive particles 2.

The cutting process using the gang saw 10 is carried out in such a manner that, when the frame 11 is swung by the frame driver 12, the cutting tips 12 attached to the frame 11 cuts through the workpiece while swing, thereby cutting the workpiece.

In the case of the gang saw 10, the frame thereof can cut through the workpiece during the cutting process. Accordingly, there is an advantage in that it is possible to cut a large-size workpiece irrespective of the size of the workpiece.

Also, the frame can be maintained in a rectilinear state because tensile stress is applied to the frame at opposite ends of the frame. Accordingly, there is an advantage in that the loss of the raw material can be minimized because the cutting tip can be thinner than the cutting tip of the disc shaped cutting tool.

Meanwhile, since the gang saw cuts a workpiece while swing in opposite directions, the gang saw is not divided into front and rear portions. For this reason, there is no tail formed around the abrasive material. As a result, the gang saw has a serious drawback in that abrasive particles may be easily separated from the matrix. This will be described in detail with reference to FIGS. 4A and 4B.

FIGS. 4A and 4B are schematic views for explaining a tail formation mechanism around an abrasive particle in a unidirectional cutting process and in a bidirectional cutting process.

FIG. 4A is a schematic view taken in the thickness direction of a cutting tip, illustrating one abrasive particle and the surrounding thereof on the cutting surface of a disc-shaped cutting tool.

In the case of the disc-shaped cutting tool, a tail 31 of a matrix 3 is well formed behind the abrasive particle 2, as shown in FIG. 4A, because the cutting tool performs a cutting operation while rotating in one direction. Referring to FIG. 4A, it can be seen that the tail 31 supports the abrasive particle 2.

Although the length of the tail 31 depends on the conditions given, it is effective when it corresponds to about 5 times the size of the abrasive particle 2.

FIG. 4B is a schematic view taken in the thickness direction of a cutting tip, illustrating one abrasive particle and the surrounding thereof on the cutting surface of a swing type frame saw.

In the case of the swing type frame saw, a metal matrix 3 around an abrasive particle 2 is worn without being protected by the abrasive particle 2 because the swing type frame saw performs a cutting operation in opposite directions, as shown in FIG. 4B. Referring to FIG. 4B, it can be seen that there is no tail formed around the abrasive particle 2.

When no tail is formed, the force supporting the abrasive particle 2 is weak. As a result, even when a small portion of the abrasive particle 2 is exposed, the abrasive particle 2 may be easily separated. For this reason, the lifespan of the cutting tool is greatly reduced.

Furthermore, the protruded height of the abrasive particle directly participating in the cutting operation is very low, thereby causing a degradation in cutting performance.

As a result, when a hard workpiece such as granite is cut, the expense of the cutting tool increases greatly. For this reason, the swing type frame saw is mainly used to cut marble having a low hardness.

Conventionally, in order to cut a large-size granite, the steel frames work together with a slurry containing steel shoot and lime dispersed in water. In this case, however, there is a drawback in that the lifespan of the cutting tool is reduced.

The swing type frame saw such as the above-mentioned gang saw may be used to cut a large-size granite, as long as the problem of the early separation of abrasive particles is solved to enable an increase in cutting speed.

To this end, active research has been conducted to achieve an enhancement in the binding force between abrasive particles and metal matrix binding the abrasive particles. However, there is no noticeable effect obtained by such research. Furthermore, there is a limitation in applying the effects obtained by such research.

DISCLOSURE OF INVENTION

Technical Problem

It is an aspect of the present invention to provide a swing type cutting tip including abrasive particles having a specific arrangement capable of enhancing the cutting efficiency of the abrasive particles, and thus achieving an enhancement in cutting performance and an increase in lifespan, and a frame saw provided with the cutting tip.

Technical Solution

Hereinafter, the present invention will be described.

In accordance with one aspect, the present invention provides a swing type cutting tip comprising a plurality of abrasive particles to cut a workpiece while swing, wherein: at least a part of the abrasive particles are arranged in the form of abrasive particle groups; each abrasive particle group is constituted by at least two abrasive particles; and the abrasive particles of each abrasive particle group are at least overlapped in a cutting direction.

In accordance with another aspect, the present invention provides a frame saw comprising a plurality of swing type cutting tips each having the above-described configuration.

Advantageous Effects

In accordance with the present invention, it is possible to provide a swing type cutting tip capable of achieving an enhancement in cutting performance and an increase in lifespan, and a frame saw provided with the cutting tip.

BRIEF DESCRIPTION OF THE DRAWINGS

FIGS. 6A to 6C are schematic views illustrating a variation in the height of a matrix depending on the distance between two abrasive particles constituting an abrasive particle pair;

FIGS. 7A to 7C are schematic views illustrating positions of abrasive particles and matrix heights in abrasive particle groups constituted by two, three, and four abrasive particles, respectively;

BEST MODE FOR CARRYING OUT THE INVENTION

Hereinafter, the present invention will be described in detail.

Preferably, the present invention is applied to a swing type cutting tip used to cut or drill a brittle workpiece such as stone, brick, concrete, or asphalt while swing and a frame saw provided with the cutting tip.

The cutting tip, which is used for a frame saw, includes an abrasive material directly conducting a cutting operation during a cutting process for a workpiece, and a metal matrix functioning to fix the abrasive material.

The present invention relates to arrangement of the abrasive particles.

Preferably, the present invention is applied to a swing type cutting tip including a plurality of abrasive particles to cut a brittle workpiece while swing and a frame saw provided with the cutting tip.

In accordance with the present invention, at least a part of the abrasive particles distributed on the cutting surface should be arranged in the form of particle groups.

Preferably, the rate of the particle groups is 10% or more of the total amount of the abrasive particles. When the abrasive particles are randomly mixed with the matrix, abrasive particles corresponding to less than 10% of the total abrasive particle amount can be grouped. For this reason, when the rate of the particle groups is less than 10% of the total abrasive particle amount, the effect of enhancing the cutting efficiency of the abrasive particles is insufficient.

In order to further enhance the cutting efficiency of the abrasive particles, it is more preferred that abrasive particles corresponding to at least 30% of the total abrasive particle amount be grouped.

Meanwhile, it is possible to design the abrasive particle arrangement such that 100% of the abrasive particles are arranged to form particle groups.

In a practical process, when a part of the grouped abrasive particles are separated from the matrix, the rate of the grouped abrasive particles observed on the cutting surface is reduced.

However, abrasive particles remaining alone may be more easily separated from the matrix. Accordingly, if a design is made such that 100% of the abrasive particles are arranged to form particle groups, at least 50% of the abrasive particles can be arranged on the cutting surface in the form of particle groups.

It is preferred that the distance between abrasive particles of an group in the cutting direction be appropriately determined. This will be described in detail hereinafter.

Figure 1:
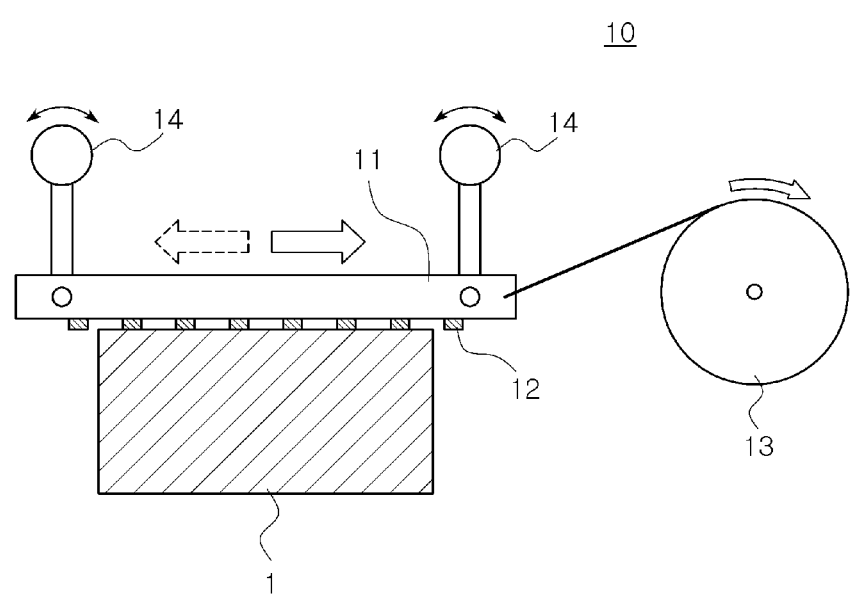
FIG. 1 is a schematic view illustrating an example of a general swing type frame saw including a horizontal frame.
Figure 2:
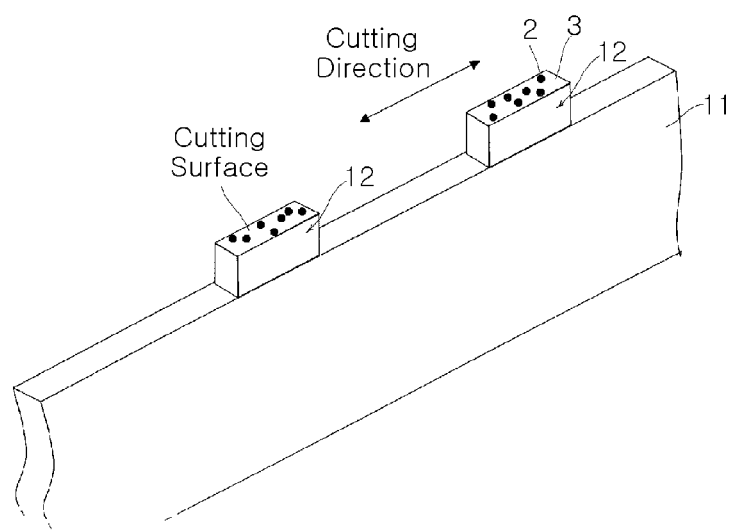
FIG. 2 is a schematic view illustrating an example of a swing type frame saw including cutting tips mounted to a frame of the frame saw.
Figure 3:
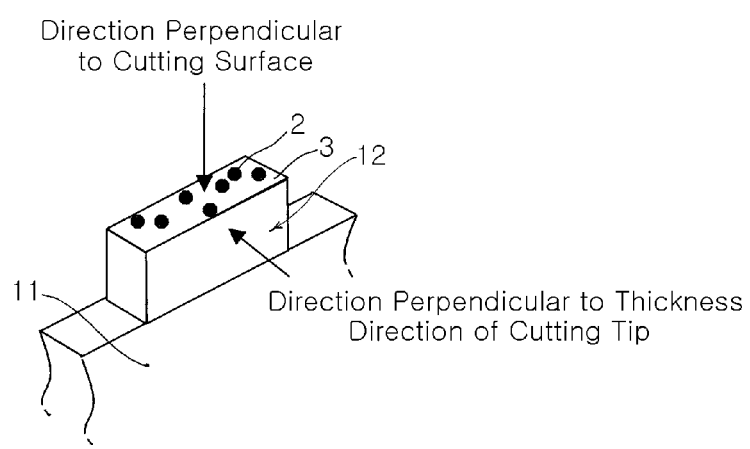
FIG. 3 is a schematic view illustrating directional relations in the swing type frame saw.
Figure 4:
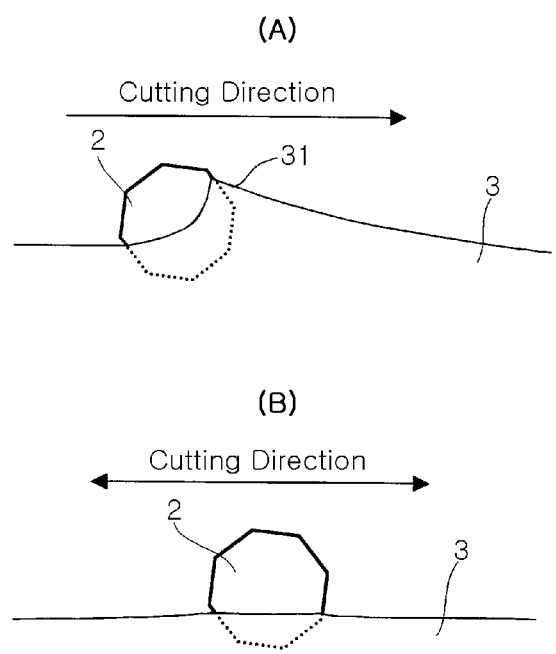
FIGS. 4A and 4B are schematic views for explaining a tail formation mechanism around an abrasive particle in a unidirectional cutting process and in a bidirectional cutting process.
Figure 5:
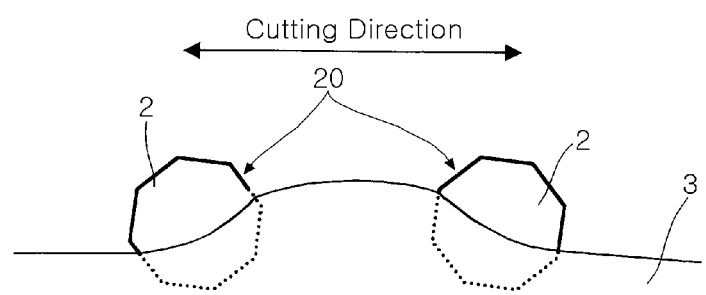
FIG. 5 is a schematic view illustrating a preferred example of an abrasive particle group formed on the cutting tip, on which abrasive particles are arranged, in accordance with the present invention.

FIG. 5 illustrates a preferred example of an abrasive particle group formed on the cutting surface, on which abrasive particles are arranged, in accordance with the present invention. As shown in FIG. 5, the abrasive particles 2 are arranged in a line in the cutting direction, to form an abrasive particle group 20. The abrasive particle group 20 includes two abrasive particles 2.

The distance between the abrasive particles 2 may correspond to a fraction of the particle size or several times the particle size in accordance with the size or kind of the abrasive particles used. However, the matrix 3 present between the abrasive particles 2 should have a larger height than other regions, so as to support the abrasive particles 2.

FIGS. 6A to 6C schematically illustrate a variation in the height of the matrix 3 depending on the distance between two abrasive particles constituting an abrasive particle group (abrasive particle pair), as in FIG. 5.

FIGS. 6A to 6C are only adapted for schematic illustration of the shape varying depending on the relative distance between the abrasive particles, and are irrespective of the absolute value of the distance between the abrasive particles. This is because the distance between the abrasive particles varies depending on the physical properties of the matrix, the kind and size of the abrasive particles, or the amount of the abrasive particles.

Referring to FIGS. 6A to 6C, it can be seen that, when it is assumed that the distance in FIGS. 6A and 6B is a reference distance between the abrasive particles, the height of the matrix in the case, in which the reference abrasive particle distance is maintained, as in FIG. 6A, is larger than the height of the matrix in the case in which the distance between the abrasive particles is larger than the reference abrasive particle distance, as in FIG. 6B.

Accordingly, the case of FIG. 6A maintaining the reference abrasive particle distance has a higher abrasive particle support force than the case of FIG. 6B.

That is, when the distance between abrasive particles increases, as in FIG. 6B, it is impossible to sufficiently prevent the matrix between the abrasive particles from being worn out. In this case, the height of the matrix is reduced, so that the abrasive particles may be easily separated from matrix.

Thus, when the distance between the abrasive particles forming a particle group is excessively long, the abrasive particles have no influence on each other. The grouped abrasive particles have the same effect as abrasive particles present alone.

On the other hand, when the distance between the abrasive particles is excessively short, as shown in FIG. 6C, the amount of the matrix supporting the abrasive particles is insufficient because the abrasive particles almost adjoin, even though the height of the matrix increases.

Thus, the abrasive particle supporting force increases as the height of the matrix increases under a certain condition. However, under other conditions, the amount of the matrix supporting the abrasive particles may be insufficient, so that the abrasive particles may be easily separated, as compared to the case maintaining an appropriate distance.

Accordingly, the distance between two abrasive particles should be appropriately determined, based on the kind of the matrix, the size of the abrasive particles, or the application field.

Preferably, the distance between the grouped abrasive particles in the cutting direction is 3 times or less the size of the abrasive particles. When the distance between the grouped abrasive particles in the cutting direction is more than 3 times the size of the abrasive particles, the height of the matrix present between the grouped abrasive particles is reduced, thereby causing the force supporting the abrasive particles to be considerably reduced.

Although it is preferred that the abrasive particle group be constituted by two abrasive particles, namely, a pair of abrasive particles, as shown in FIG. 5, the abrasive particle group is not limited thereto. The abrasive particle group may be constituted by three or more abrasive particles. This will be described hereinafter.

When one abrasive particle of an abrasive particle group is separated in the case in which the number of the abrasive particles constituting the abrasive particle group is 2, the matrix present around the remaining other abrasive particle may be early worn in accordance with a swing motion of cutting process. As a result, the remaining abrasive particle may also be early separated.

In order to retard such a phenomenon, the abrasive particle group may be constituted by three or more abrasive particles.

FIGS. 7A to 7C schematically illustrate positions of abrasive particles and matrix heights in abrasive particle groups constituted by two, three, and four abrasive particles, respectively.

FIG. 7A illustrates the case in which the number of abrasive particles constituting an abrasive particle group is 2. FIG. 7B illustrates the case in which the number of abrasive particles constituting an abrasive particle group is 3. FIG. 7C illustrates the case in which the number of abrasive particles constituting an abrasive particle group is 4.

In an abrasive particle group constituted by three abrasive particles 2, as shown in FIG. 7B, it is possible to conduct a cutting process for a prolonged period of time. This is because, even when one of the outer abrasive particles is separated, two abrasive particles still remain.

When the number of abrasive particles constituting an abrasive particle group increases, the maintenance time of the abrasive particle group by two or more adjacent particles increases. Accordingly, it is possible to conduct a cutting process for a prolonged period of time.

Figure 8:
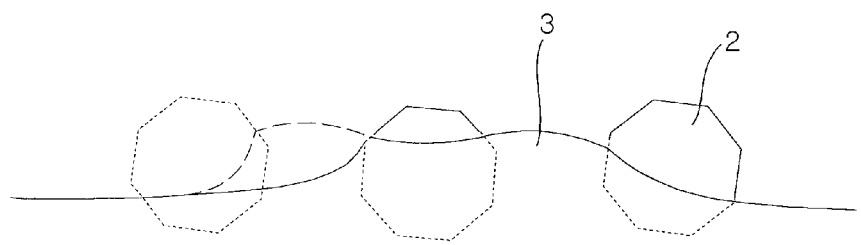
FIG. 8 is a schematic view illustrating a variation in the height of a matrix surrounding three abrasive particles constituting an abrasive particle group when one of the outer abrasive particles is separated, and a state in which the abrasive particle group is still maintained by the remaining two abrasive particles after the separation of the outer abrasive particle.

FIG. 8 illustrates a variation in the height of a matrix 3 surrounding three abrasive particles 2 constituting an abrasive particle group when one of the outer abrasive particles 2 is separated, and a state in which the abrasive particle group is still maintained by the remaining two abrasive particles 2 after the separation of the outer abrasive particles 2.

For example, even when two outer abrasive particles are separated from an abrasive particle group constituted by four abrasive particles, as shown in FIG. 7C, the abrasive particle group can be still maintained by the remaining two abrasive particles.

However, when the number of abrasive particles constituting an abrasive particle group is increased, it is necessary to add an increased number of abrasive particles to participate in a cutting operation. In this case, the abrasive particles arranged in an inner portion of the abrasive particle group do not particularly participate in the cutting operation until the abrasive particles arranged in outer portions of the abrasive particle group are separated. For this reason, an increase in load causing a degradation in cutting efficiency occurs. To this end, the abrasive particle group should be constituted by an appropriate number of abrasive particles in accordance with the kind of the matrix, the number of added abrasive particles, and the application field.

Although the abrasive particle group constituted by three abrasive particles has an advantage in that, even after an outer one of the abrasive particles is separated, the cutting process can be continuously carried out by the remaining abrasive particles, the number of abrasive particles constituting an abrasive particle group should be appropriately selected in accordance with the conditions used. This is because the time, for which each abrasive particle in the abrasive particle group participates in the cutting operation, or the cutting load of each abrasive particle is different from those of the remaining abrasive particles.

That is, the abrasive particles arranged in the inner portion of the abrasive particle group do not participate in the cutting operation until the outer abrasive particles are separated. In other words, the inner abrasive particles participate late in the cutting operation.

For an optimal abrasive particle arrangement, it is necessary to determine the position of each abrasive particle such that the abrasive particle can achieve its function in maximum.

Accordingly, in the case of an abrasive particle group constituted by three or more abrasive particles, it is preferable to differently design the quality levels of the abrasive particles and the phases of the abrasive particles in accordance with loads applied to the abrasive particles such that the total amount of work difference of each abrasive particle from the remaining abrasive particles is minimized, and thus, the abrasive p articles achieve their functions in maximum, because the loads applied to the abrasive particles are different due to the different positions of the abrasive particles.

FIGS. 9A to 9D illustrate a phase difference of an inner abrasive particle from that of outer abrasive particles in an abrasive particle group constituted by three abrasive particles.

Figure 9:
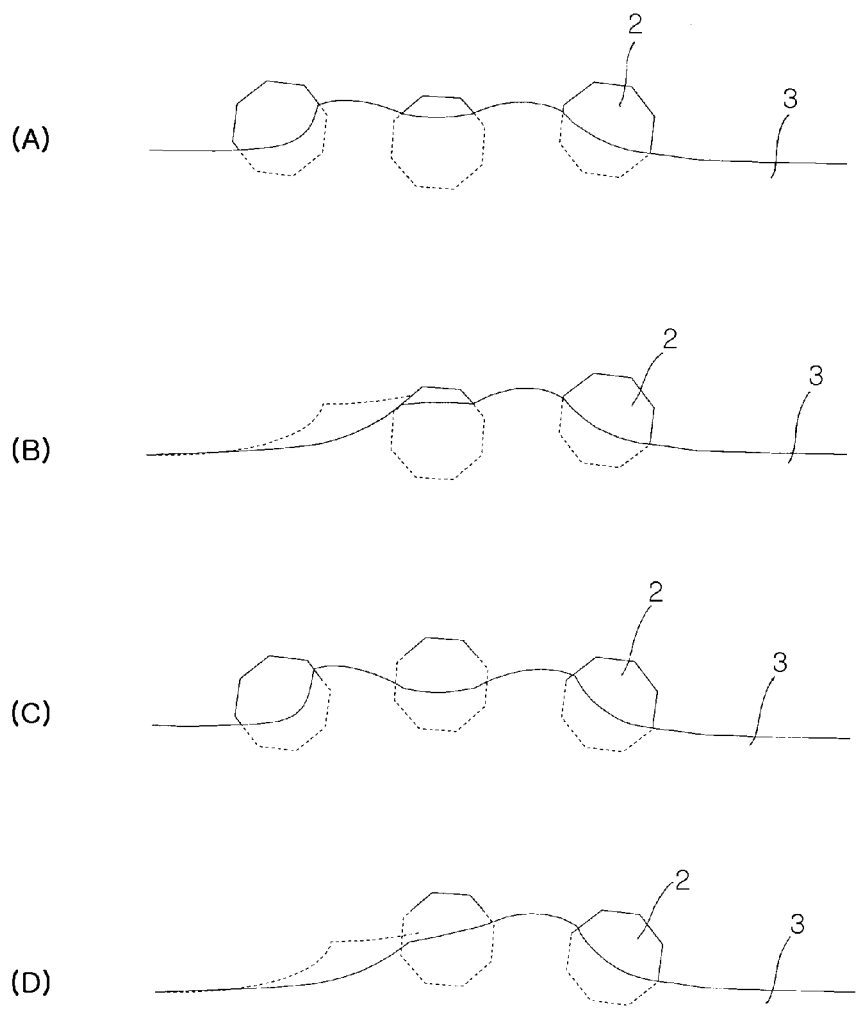
FIGS. 9A to 9D are schematic views illustrating a phase difference of an inner abrasive particle from that of outer abrasive particles in an abrasive particle group constituted by three abrasive particles.

FIG. 9A illustrates the case in which the intermediate abrasive particle has a phase slightly lower than the outer abrasive particles. Here, the lower phase of one abrasive particle means that the abrasive particle has a protrusion height lower than other abrasive particles.

When one of the outer abrasive particles is separated during a cutting process, the abrasive particle group is maintained in the form of an abrasive particle pair by the remaining abrasive particles, namely, the outer abrasive particle originally arranged at the outside and the inner abrasive particle originally arranged at the inside.

As the cutting process is continued, the abrasive particle originally arranged at the outside is separated. In this state, the abrasive particle originally arranged at the inside is separated after further performing a cutting operation for a period of time corresponding to the phase difference from the abrasive particle originally arranged at the outside. Thus, the abrasive particle group constituted by abrasive particles having different phases participates in the cutting operation for a period of time longer than that of the abrasive particle group constituted by abrasive particles having the same phase.

That is, since the abrasive particle arranged at the intermediate position in the abrasive particle group participates in the cutting operation later, it further performs a cutting operation even after the outer abrasive particles are separated, and then is separated.

FIG. 9C illustrates the case in which the intermediate abrasive particle has a phase slightly higher than the outer abrasive particles. When one of the outer abrasive particles is separated during a cutting process, the inner one of the abrasive particles in the abrasive particle group has a slightly-increased phase, contrary to the case of FIG. 9B, as shown in FIG. 9D.

In this case, the height of the matrix supporting the intermediate abrasive particle is high, and the phase of the intermediate abrasive particle is also high. Accordingly, the intermediate abrasive particle has an effect of enhancing the cutting efficiency.

Thus, it is possible to achieve an enhancement in cutting efficiency and an increase in lifespan by selectively providing a slight phase difference among abrasive particles constituting an abrasive particle group in accordance with the application field.

Figure 10:
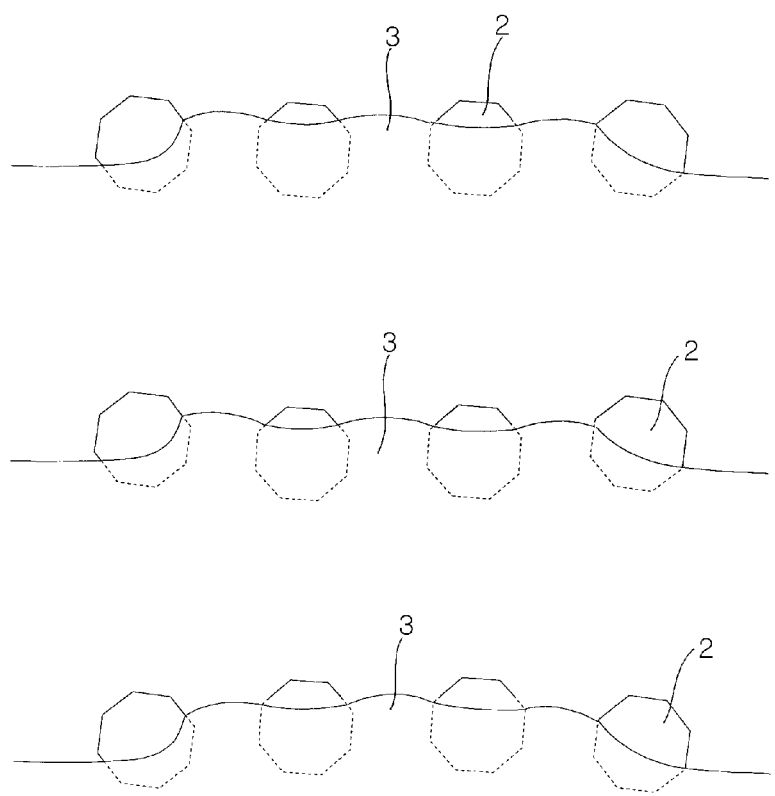
FIG. 10 is a schematic view illustrating an example in which four abrasive particles constitute an abrasive particle group, and two intermediate ones of the abrasive particles have a different phase.

FIG. 10 is a schematic view illustrating an example in which four abrasive particles constitute an abrasive particle group.

As described above, the abrasive particle group according to the present invention is constituted by two or more abrasive particles. It is preferred that the abrasive particle group be constituted by 2 to 4 abrasive particles. This is because, when the number of abrasive particles constituting the abrasive particle group is more than four, the rate of abrasive particles participating in a cutting operation is low, as compared to the amount of added abrasive particles, thereby causing an increase in working load.

The abrasive particles, which are aligned to constitute an abrasive particle group, should be arranged such that at least a part of the abrasive particles are overlapped. This is because, when the abrasive particles of the abrasive particle group protect the matrix arranged therebetween, the matrix can support the abrasive particles.

Figure 11:
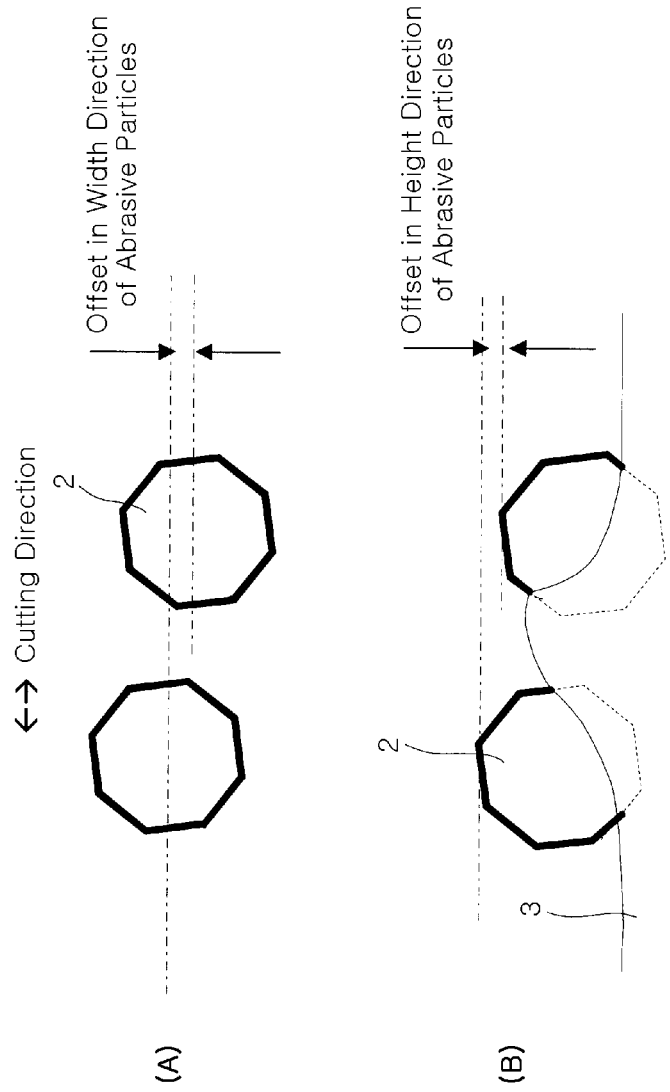
FIGS. 11A and 11B are schematic views illustrating the misalignment degree of one abrasive particle from the center of another abrasive particles, in which FIG. 11A schematically illustrates the misalignment degrees of two abrasive particles in an abrasive particle group in a direction perpendicular to the cutting direction and in a direction parallel to the through thickness direction, and FIG. 11B schematically illustrates two abrasive particles of an abrasive particle group extending perpendicularly to the cutting direction and perpendicularly to the through thickness direction.

FIG. 11A schematically illustrates the misalignment degrees of two abrasive particles 2 in an abrasive particle group in a direction perpendicular to the cutting direction and in a direction parallel to the through thickness direction.

One abrasive particle in the abrasive particle group is misaligned from the center of the other abrasive particle.

Hereinafter, the misalignment degree of one abrasive particle from the center of the other abrasive particle is referred to as "offset".

An offset of 0 means that the abrasive particles of the abrasive particle group are correctly aligned in the cutting direction, such that the misalignment degree of the abrasive particles in the cutting direction is 0.

Ideally, an offset of 0 is possible. Although an offset of 0 is most preferable, there is naturally an offset higher than 0 because the abrasive particles practically have different size or different shapes.

It is preferred that the distance between adjacent abrasive particles in an abrasive particle group in a direction perpendicular to the cutting direction and parallel to the through thickness direction, namely, the offset in a width direction, is 50% or less of the abrasive particle size. This is because, when the offset is higher than the above value, the abrasive particles cannot prevent the matrix arranged between the abrasive particles from being worn, so that the matrix may be easily abraded, thereby causing the abrasive particles to be easily separated.

FIG. 11B schematically illustrates two abrasive particles 2 of an abrasive particle group extending perpendicularly to the cutting direction and perpendicularly to the through thickness direction.

That is, FIG. 11B shows the positions of the abrasive particles in view of thickness direction of the cutting tip.

FIG. 11B shows that the abrasive particles of the abrasive particle group have different phases. Ideally, it is possible that the offset of the abrasive particles in a height direction, namely, the phase difference between the abrasive particles, is 0. Although an offset of 0 is most preferable, there is naturally an offset higher than 0 because the abrasive particles practically have different size or different shapes.

FIG. 11B defines the offset of the abrasive particles based on the abrasive surface portion having the highest phase. When the offset is measured based on the center of one abrasive particle, it is difficult to achieve the offset measurement. Accordingly, the offset definition is conducted in the above-described manner such that the offset measurement can be achieved on the cutting surface.

It is preferred that the distance between the abrasive particles in the abrasive particle group in a direction perpendicular to the cutting direction and perpendicular to the through thickness direction, namely, the offset in view of height direction, be 50% or less of the abrasive particle size. This is because, when the offset is higher than the above value, one of the abrasive particles cannot prevent the matrix arranged between the abrasive particles from being abraded, so that the abrasive particles may be easily separated.

In the above-described cutting tip, several groups of abrasive particle may be aligned to form an abrasive particle line.

At least two abrasive particle groups may be present in a direction parallel to the cutting direction. In this arrangement, it is preferred that the spacing between the adjacent abrasive particle groups be appropriately determined. This will be described hereinafter.

Figure 12:
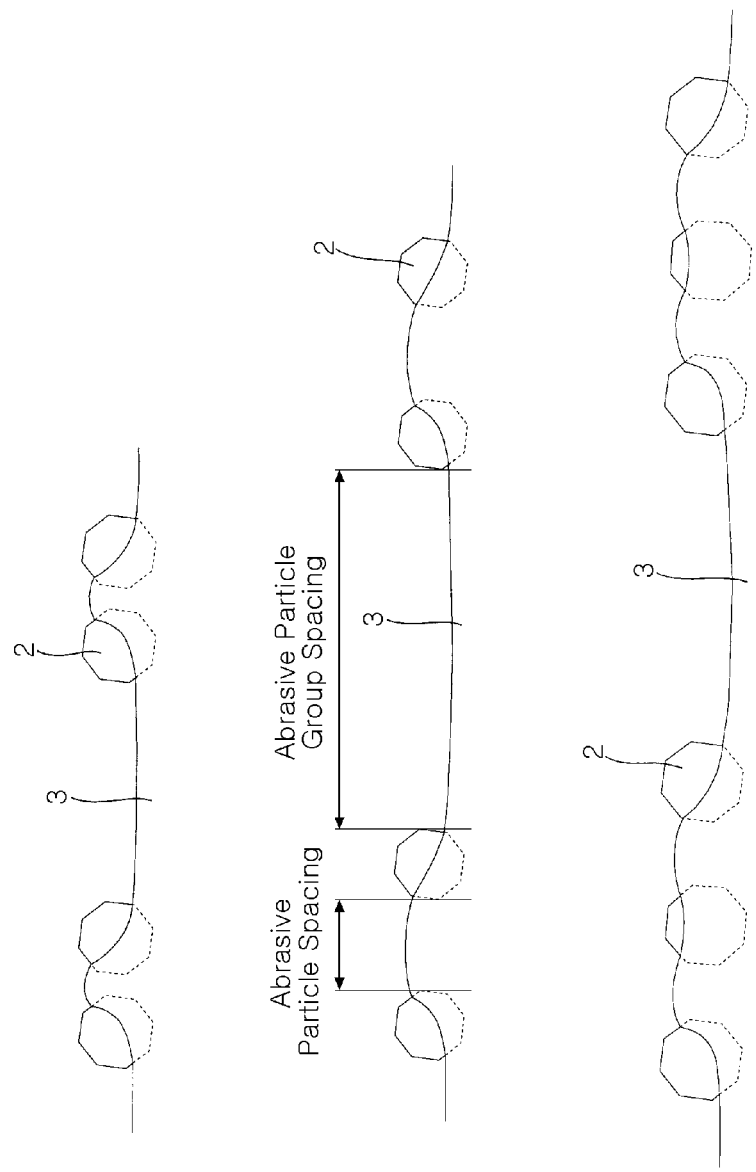
FIG. 12 is a schematic view illustrating definition of the spacing between abrasive particle groups.

FIG. 12 is a schematic view illustrating definition of the spacing between abrasive particle groups (hereinafter, referred to as "abrasive particle group spacing").

The spacing between the adjacent abrasive particles in each abrasive particle group should be sufficiently narrow to enable the abrasive particles to achieve a function for suppressing abrasion of the matrix present between the abrasive particles, and thus supporting the matrix. However, the spacing between the adjacent abrasive particle groups should be sufficiently wide to enable the outer particles of the abrasive particle groups to participate in the cutting operation.

Generally, a better cutting efficiency is obtained at a higher protrusion height of each abrasive particle. Here, the protrusion height of each abrasive particle is defined by the height of the abrasive particle protruded from the phase of the matrix.

In order to achieve an enhancement in cutting efficiency, accordingly, the abrasive particle group spacing should be sufficiently wide to allow the matrix present between the abrasive particle groups to be appropriately abraded such that the protrusion height of the abrasive particles is increased.

When the abrasive particle group spacing is larger than about 5 times the abrasive particle size, it is possible to secure a sufficient particle protrusion height. Preferably, the abrasive particle group spacing is about 10 times or more the abrasive particle size. In this case, it is possible to further enhance the cutting force of the abrasive particles.

Practically, the cutting tip includes a plurality of abrasive particle lines laminated in the form of multiple layers on the cutting surface in a direction perpendicular to the cutting direction (the thickness direction of the cutting tip). Each abrasive particle line includes a plurality of abrasive particle groups.

Figure 13:
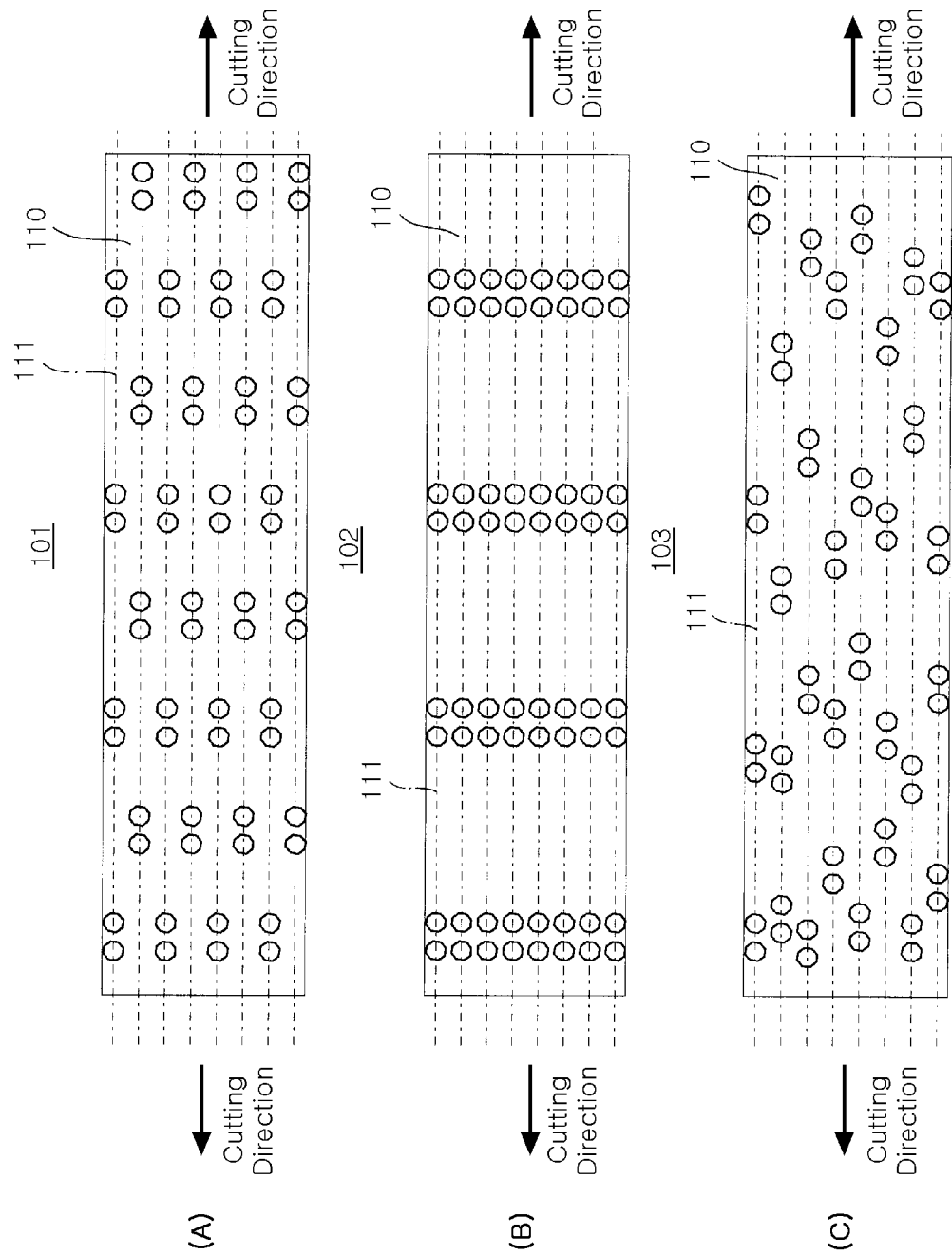
FIGS. 13A to 13C are schematic views illustrating cutting surfaces having different abrasive particle arrangements according to the present invention, respectively.

FIGS. 13A to 13C schematically illustrate examples of the cutting surface of a cutting tip according to the present invention.

Each of FIGS. 13A to 13C illustrates the cutting surface of the cutting tip. As shown in each of FIGS. 13A to 13C, the cutting tip includes a plurality of abrasive particle lines 111 laminated in the form of multiple layers on the cutting surface in the thickness direction of the cutting tip. Each abrasive particle line 111 includes a plurality of abrasive particle groups.

FIG. 13A illustrates a cutting tip 101 in which each abrasive particle pair of each odd abrasive particle line 111 and a corresponding abrasive particle pair of each even abrasive particle line 111 are arranged at different positions in the cutting direction on a cutting surface 110. FIG. 13B illustrates a cutting tip 102 in which each abrasive particle pair of each odd abrasive particle line 111 and a corresponding abrasive particle pair of each even abrasive particle line 111 are arranged at the same position in the cutting direction on a cutting surface 110. FIG. 13C illustrates a cutting tip 103 in which the position of each abrasive particle pair of one abrasive particle line 111 is irrespective of the position of each abrasive particle pair of another abrasive particle line 111.

Each of FIGS. 13A to 13C illustrates the case in which the abrasive particle line spacing is larger than the size of the abrasive particles. When the abrasive particle line spacing is larger than the size of the abrasive particles, a groove is formed between adjacent abrasive particle lines in a region where there is no abrasive particle.

In this case, cut debris can be removed through the groove channel. Accordingly, it is possible to achieve an enhancement in cutting efficiency. However, there is a drawback in that separation of abrasive particles occurs early because the amount of the matrix present at the opposite lateral sides of each abrasive particle is small.

Figure 14:
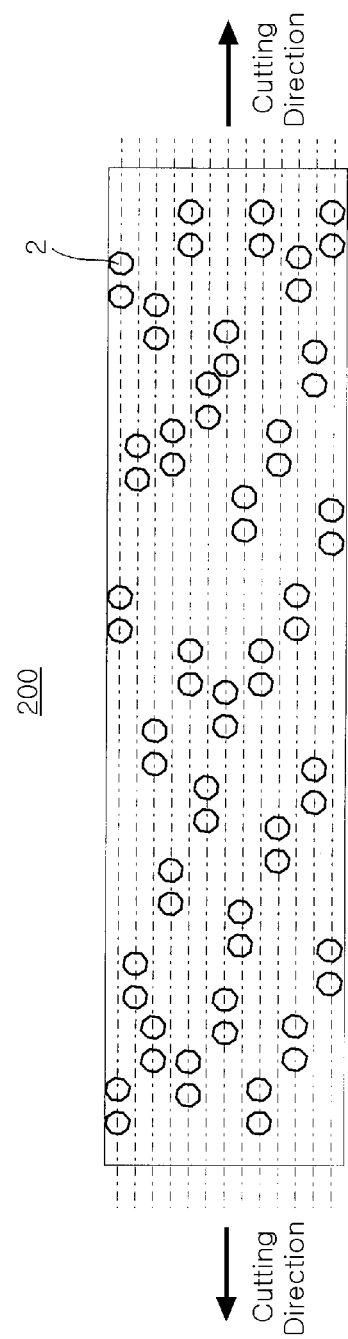
FIG. 14 is a schematic view illustrating a cutting surface having another abrasive particle arrangement according to the present invention.

An example of an abrasive particle arrangement to compensate for such a phenomenon is illustrated in FIG. 14.

FIG. 14 illustrates a cutting tip 200 in which the spacing of abrasive particle lines is not more than the abrasive particle size. In this arrangement, there is an advantage in that the abrasive particles 2 prevent formation of a deep groove parallel to the cutting direction, so that an enhancement in abrasive particle supporting force is achieved.

In this case, however, a degradation in cutting efficiency may occur due to a reduction in the protrusion height of the abrasive particles. Accordingly, it is necessary to appropriately set the abrasive particle line spacing in accordance with the application of the cutting tip.

Figure 15:
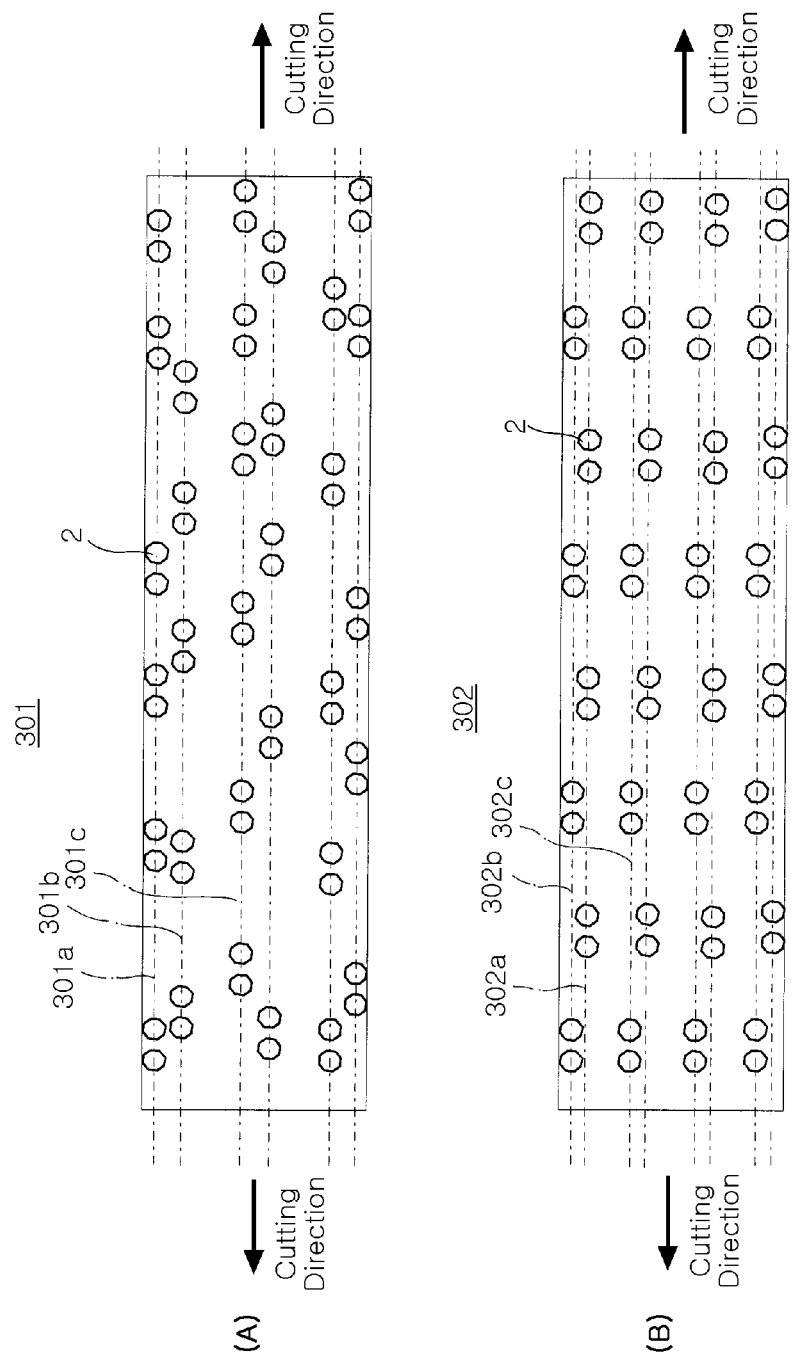
FIGS. 15A and 15B are schematic views illustrating cutting surface each having another abrasive particle arrangement according to the present invention.

Examples of an abrasive particle arrangement capable of exhibiting the advantages of both the case of FIGS. 13A to 13C and the case of FIG. 14 are illustrated in FIGS. 15A and 15B.

FIG. 15A illustrates a cutting tip 301 in which abrasive particles 2 are arranged in lines such that one of three adjacent abrasive particle lines 301a, 301b, and 301c, for example, the abrasive particle line 301a, does not overlap with the remaining two adjacent abrasive particle lines 301b and 301c while being closer to one of the two abrasive particle lines 301b and 301c.

FIG. 15B illustrates a cutting tip 302 in which abrasive particles 2 are arranged in lines such that the abrasive particles in one of three adjacent abrasive particle lines 302a, 302b, and 302c, for example, the abrasive particle line 302a, overlap with the abrasive particles in one of the remaining two adjacent abrasive particle lines 302b and 302c, namely, the abrasive particle line 302b, without overlapping with the abrasive particles in the other remaining abrasive particle line 302c.

When the abrasive particles of the abrasive particle lines are arranged in the above-described manner, it is possible to suppress abrasion of the matrix supporting the abrasive particles, and to form a groove at the matrix, and thus to easily remove debris. Accordingly, it is possible to enhance both the cutting efficiency and the lifespan.

Figure 16:
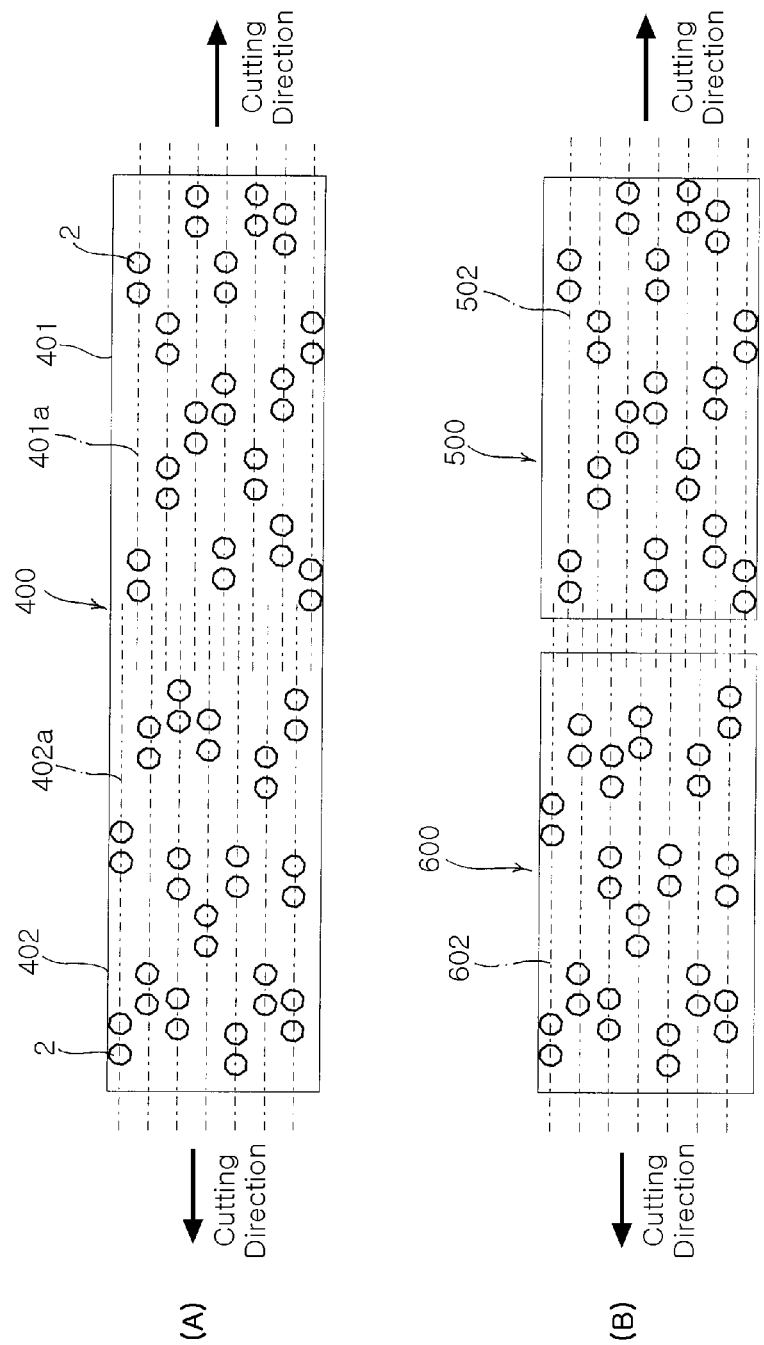
FIGS. 16A and 16B are schematic views illustrating cutting surface each having another abrasive particle arrangement according to the present invention.

Examples of a cutting tip capable of obtaining effects similar to those of FIGS. 15A and 15B are illustrated in FIGS. 16A and 16B.

FIG. 16A illustrates a cutting tip 400. The cutting tip 400 includes at least two regions 401 and 402 in which abrasive particles 2 are arranged in lines such that each abrasive particle line includes two or more abrasive particle groups. Also, the abrasive particle lines are arranged in the regions 401 and 402 such that each of cut grooves formed in a workpiece by the abrasive particle lines in a trailing one of the regions 401 and 402, for example, the region 402, is arranged between adjacent ones of grooves formed in the workpiece by the abrasive particle lines in a leading one of the regions 401 and 402, for example, the region 401.

FIG. 16B illustrates a combination of cutting tips 500 and 600. In each of the cutting tips 500 and 600, abrasive particles 2 are arranged in lines such that each abrasive particle line includes two or more abrasive particle groups. Also, the abrasive particle lines are arranged in the cutting tips 500 and 600 such that each of cut grooves formed in a workpiece by the abrasive particle lines in a trailing one of the cutting tips 500 and 600, for example, the cutting tip 600, is arranged between adjacent ones of cut grooves formed in the workpiece by the abrasive particle lines in a leading one of the cutting tips 500 and 600, for example, the cutting tip 500.

The definition of "leading" and "trailing" is based on the case in which cutting is carried out in one direction. Since the frame saw reciprocates, the leading region or leading cutting tip may become a trailing region or trailing cutting tip at the next swing motion.

In accordance with the above-described arrangement, it is possible to prevent formation of an excessively-deep groove between adjacent abrasive particle lines, and thus to enhance the force supporting the abrasive particles.

For the abrasive particles in the present invention, any abrasive particles may be used as long as they are generally used. Representative examples of the abrasive particles may include artificial diamonds, natural diamonds, cubic boron nitride, and tungsten particles are well known. Of these materials, artificial diamond particles are most preferable.

Meanwhile, the present invention provides a frame saw including a plurality of swing type cutting tips according to the present invention.

INDUSTRIAL APPLICABILITY

In accordance with the present invention, a swing type cutting tip capable of achieving an enhancement in cutting performance and an increase in lifespan and a frame saw provided with the cutting tip are provided.

The invention claimed is:

1. A swing type cutting tip comprising a plurality of abrasive particles for cutting a workpiece while swinging, wherein:
at least a part of the abrasive particles are arranged to form abrasive particle groups;
each abrasive particle group is constituted by at least two abrasive particles;
the abrasive particles of each abrasive particle group are at least overlapped in a cutting direction;
the distance between adjacent ones of the abrasive particle groups in the cutting direction is no less than 5 times the size of the abrasive particles;
the abrasive particles of each abrasive particle croup are not in contact with each other;
the abrasive particles are arranged in lines; and
the distance between adjacent ones of the abrasive particles constituting each abrasive particle group is 3 times or less than the size of the abrasive particles.

2. The swing type cutting tip according to claim 1, wherein the rate of the abrasive particles constituting the abrasive particle groups is at least 30% of the overall abrasive particles.

3. The swing type cutting tip according to claim 1, wherein the number of the abrasive particles constituting each abrasive particle group is 2 to 4.

4. The swing type cutting tip according to claim 1, wherein the distance between adjacent ones of the abrasive particles constituting each abrasive particle group is 3 times or less the size of the abrasive particles.

5. The swing type cutting tip according to claim 3, wherein the distance between adjacent ones of the abrasive particles constituting each abrasive particle group is 3 times or less the size of the abrasive particles.

6. The swing type cutting tip according to claim 1, wherein the distance between adjacent ones of the abrasive particles constituting each abrasive particle group in a direction perpendicular to the cutting direction and parallel to the through thickness direction (an offset in a width direction) is 50% or less of the size of the abrasive particles.

7. The swing type cutting tip according to claim 1, wherein the distance between adjacent ones of the abrasive particles constituting each abrasive particle group in a direction perpendicular to the cutting direction and perpendicular to a cutting surface (an offset in a height direction) is 50% or less of the size of the abrasive particles.

8. The swing type cutting tip according to claim 1, wherein the spacing between adjacent ones of the abrasive particle lines is larger than the size of the abrasive particles.

9. The swing type cutting tip according to claim 1, wherein the spacing between adjacent ones of the abrasive particle lines is not larger than the size of the abrasive particles.

10. The swing type cutting tip according to claim 1, wherein the abrasive particles are arranged in lines to form abrasive particle lines spaced apart from one another by a distance larger than the size of the abrasive particles and abrasive particle lines spaced apart from one another by a distance not larger than the size of the abrasive particles.

11. The swing type cutting tip according to claim 1, wherein the abrasive particles are arranged in lines such that one of three adjacent abrasive particle lines does not overlap with the remaining two adjacent abrasive particle lines while being closer to one of the two abrasive particle lines.

12. The swing type cutting tip according to claim 1, wherein the abrasive particles are arranged in lines such that the abrasive particles in one of three adjacent abrasive particle lines overlap with the abrasive particles in one of the remaining two adjacent abrasive particle lines, without overlapping with the abrasive particles in the other remaining abrasive particle line.

13. The swing type cutting tip according to claim 1, wherein the cutting tip is divided into at least two regions where the abrasive particles are arranged in lines such that each abrasive particle line includes two or more abrasive particle groups, and the abrasive particle lines are arranged in the regions such that each of cut grooves formed in a workpiece during a cutting process by the abrasive particle lines in a trailing one of the regions is arranged between adjacent ones of cut grooves formed in the workpiece by the abrasive particle lines in a leading one of the regions.

14. The swing type cutting tip according to claim 1, wherein the abrasive particles are arranged in lines such that each abrasive particle line includes two or more abrasive particle groups, and each of cut grooves formed in a workpiece during a cutting process by trailing ones of the abrasive particle lines is arranged between adjacent ones of cut grooves formed in the workpiece by leading ones of the abrasive particle lines.

15. A frame saw comprising a plurality of cutting tips according to claim 1.

* * * * *

UNITED STATES PATENT AND TRADEMARK OFFICE
CERTIFICATE OF CORRECTION

PATENT NO.       : 8,656,901 B2                                    Page 1 of 1
APPLICATION NO. : 12/281004
DATED            : February 25, 2014
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Twenty-ninth Day of September, 2015

Michelle K. Lee
*Director of the United States Patent and Trademark Office*